F. TUDOR.
STEAM RADIATOR.
No. 185,146. Patented Dec. 5, 1876.
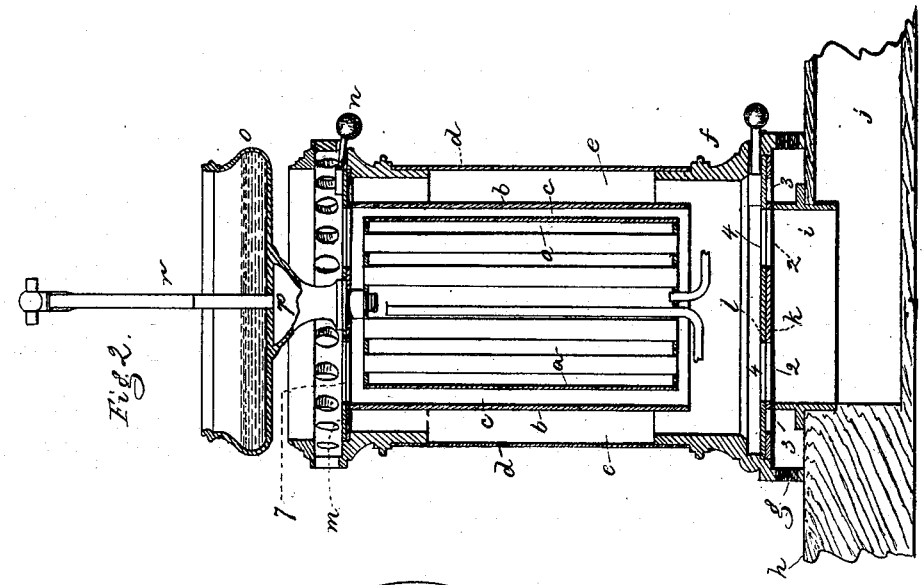
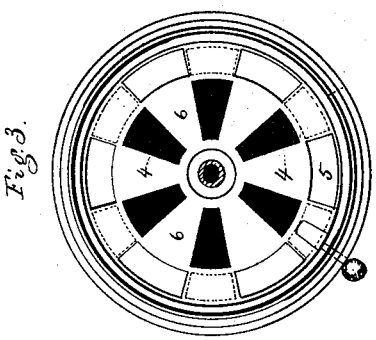
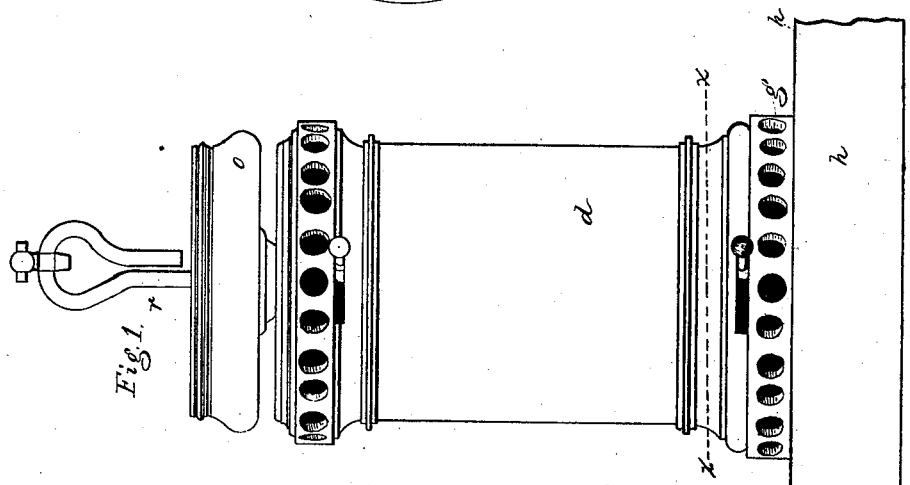
Witnesses.
L. H. Latimer.
W. J. Pratt.
Inventor.
Frederic Tudor
per Crosby & Gregory Attys.

UNITED STATES PATENT OFFICE.

FREDERIC TUDOR, OF BOSTON, MASSACHUSETTS.

IMPROVEMENT IN STEAM-RADIATORS.

Specification forming part of Letters Patent No. 185,146, dated December 5, 1876; application filed September 7, 1876.

*To all whom it may concern:*

Be it known that I, FREDERIC TUDOR, of Boston, in the county of Suffolk and State of Massachusetts, have invented an Improved Steam-Radiator, of which the following is a specification:

This invention relates to a radiator for warming and ventilating buildings or apartments; and consists in the combination, in a steam-radiator, of casings and air passages or valves, whereby both the volume of fresh air admitted and the temperature of the air warmed are easily regulated; also, in the combination, with the radiator, of an evaporator or reservoir of water, which is heated by the steam circulating within the radiator, whereby a more abundant evaporation of water is obtained than by the ordinary shallow vessel, which is heated chiefly by radiation or conduction from the hot surfaces of the source of heat.

Figure 1 represents, in front elevation, a radiator constructed in accordance with my invention; Fig. 2, a vertical section thereof; and Fig. 3, a horizontal section on line $x$ $x$, Fig. 1.

In the drawing, $a$ represents the source of heat, it being a system of steam-pipes, as shown. About this source of heat $a$ is placed a casing, $b$, leaving an air-space, $c$, and about the casing $b$ is placed an outer casing, $d$, leaving a space, $e$, for the circulation of cold air. In this form of this invention the base of the apparatus is shown at $f$, it being provided with air-passages $g$, communicating with the air of the apartment near the floor $h$. A flue, $i$, connects the base with the passage $j$, communicating with the outer or cold air. In a disk, $k$, of the base, placed above these passages $g$ $i$, I form a series of openings, 2 3, those marked 2 communicating with the external cold-air passage $j$, and those 3 with the air-passages $g$, opening into the apartment. Above the disk $k$ I place a receiving-valve, $l$, provided with openings 4 5, so located, with relation to each other, that when one of the series of passages, 2 or 3, is uncovered the other series is closed by a portion of the valve, (see Fig. 3,) wherein opening 5 of valve $l$ communicates with the opening 3, the portion 6 of the valve then covering the openings 2. Above the source of heat is placed a delivery-valve, $m$, made substantially as valve $l$, and adapted to communicate with either the cold-air space $e$ or the hot-air space $c$.

In cold weather the valve $m$ will be made to close the openings leading from chamber $e$, and the cold air then passing through the chamber $c$ will be heated by the source of heat $a$, and be discharged from the openings 7 of the valve $m$ into the room. This air to be heated may be supplied to chamber $c$ from either the outer cold-air flue $j$, or from the apartment near the floor, through openings $g$.

If the weather is mild the valve $m$ may be turned, and cut off the passage of air upward from chamber $c$, and then the air passes through chamber $e$, and is not heated, for the casing $b$ does not become sufficiently heated by radiation to affect the air in space $e$.

From the foregoing explanation, and the construction shown in the drawing, it is evident that the air admitted from the apartment near the floor, or from the outside of the building, may be conducted either through the space $c$, when it will be heated, or through the space $e$, when it will not be heated. In apartments occupied with but few persons the air may be taken at openings $g$, near the floor of the apartment. By this apparatus the volume of heated or cold air may be regulated at will.

In some forms of heating apparatus hot air from the source of heat, and fresh air from without, are led into a common duct, and mixed by means of valves working independently of each other. Such forms of apparatus required two cold-air ducts—one to the source of heat, and one to the mixing-chamber—and if the valve of one duct was closed, the volume of fresh air admitted was reduced one-half.

With my apparatus the volume of fresh air admitted is a fixed quantity, and the temperature is regulated by simply causing a portion to pass outside the inner casing, through chamber $e$, by partially or wholly closing the hot-air-delivery valve or register $m$. The quantities of air taken simultaneously from within and without the building may be regulated by the valve $l$.

It is understood that the form of the outer casing $d$ and of the valves $l\ m$ may be changed without departing from this invention. I prefer to have each valve so constructed that when it closes one series of openings it will open the other series; but instead of this single valve $l$ or $m$ I may employ two or more independent valves, which may be operated separately.

By covering the source of heat $a$ with a casing, $b$, leaving an air-space, $c$, and closing the openings leading from $c$ into the apartment, I am enabled, practically, to shut off the radiation of heat into the apartment. The evaporator $o$ is a pan with a hollow shell, $p$, into and from which steam from the source of heat passes, thereby heating the contents of the pan, and evaporating the water more rapidly than if the pan was simply placed on a heated plate, as commonly done. The size of this evaporator and its hollow shell are proportioned, as shown in the drawing, so that the heat will never be sufficient to boil the water in the evaporator. The outer casing $d$ may be an inclosing-wall.

In some instances I may omit the valve that covers the top of space $e$, leaving such space always open. In such case the area of space $e$ will be equal to, or greater than, the area of the cold-air box.

I claim—

1. The source of heat $a$, casing $b$, and outer casing, in combination with a valve to close or open the chambers $c\ e$ for the passage of heated or cold air, and with a valve to regulate the cold-air supply from outside the apartment.

2. The source of heat $a$, casing $b$, and outer casing, in combination with a valve to close or open the chambers $c\ e$ for the passage of heated or cold air, and with a valve to regulate the cold-air supply from without or within the apartment, substantially as described.

3. In a steam-radiator for warming and ventilating buildings, an evaporator, $o$, provided with a hollow shell, $p$, in combination with, and connected with, the source of heat $a$, to permit the circulation of the steam in the casing of the evaporator, all constructed and proportioned, with relation to each other, substantially as described.

In testimony whereof I have signed my name to this specification in the presence of two subscribing witnesses.

FREDERIC TUDOR.

Witnesses:
G. W. GREGORY,
L. H. LATIMER.